(12) United States Patent
Kim et al.

(10) Patent No.: US 8,703,526 B2
(45) Date of Patent: Apr. 22, 2014

(54) FABRICATION METHOD FOR QUANTUM DOT SENSITIZED SOLAR CELL USING SUPERCRITICAL FLUID OR SUBCRITICAL FLUID AND QUANTUM DOT SENSITIZED SOLAR CELL PREPARED THEREBY

(75) Inventors: Jaehoon Kim, Seoul (KR); Byoung Koun Min, Seoul (KR); Jae-Duck Kim, Seoul (KR); Jong Min Park, Seoul (KR); Wonho Jang, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 681 days.

(21) Appl. No.: 12/969,246

(22) Filed: Dec. 15, 2010

(65) Prior Publication Data

US 2011/0303269 A1 Dec. 15, 2011

(30) Foreign Application Priority Data

Jun. 15, 2010 (KR) .................. 10-2010-0056568

(51) Int. Cl.
*H01L 31/0224* (2006.01)
*H01L 31/0352* (2006.01)
*H01L 31/18* (2006.01)

(52) U.S. Cl.
USPC .............. 438/93; 257/E31.033; 257/E31.126; 977/948

(58) Field of Classification Search
None
See application file for complete search history.

(56) References Cited

U.S. PATENT DOCUMENTS

| 4,927,721 A | 5/1990 | Gratzel et al. |
| 2005/0006714 A1 | 1/2005 | Graetzel et al. |
| 2008/0170982 A1* | 7/2008 | Zhang et al. ............... 423/447.3 |

FOREIGN PATENT DOCUMENTS

| KR | 10-2008-0105908 A | 12/2008 |
| WO | WO 2009/142677 A2 | 11/2009 |

OTHER PUBLICATIONS

Mora-Sero et al., "Recomination in quantum dot sensitized solar cells," *Accounts of Chemical Research* (2009) 42 (11): 1848-1857.

(Continued)

*Primary Examiner* — Seahvosh Nikmanesh
(74) *Attorney, Agent, or Firm* — Ladas & Parry LLP

(57) ABSTRACT

A method of fabricating a transparent electrode for use in a quantum dot sensitized solar cell, and a quantum dot sensitized solar cell fabricated according to the method are provided. According to the fabrication method, (S1) quantum dot precursor is introduced into a high pressure storage vessel and a quantum dot precursor is dissolved using subcritical fluid or supercritical fluid; (S2) the quantum dot precursor fluid prepared at (S1) is transported to contact with a conductive thin layer substrate comprised of a metal oxide placed in a high pressure reaction vessel, thereby causing the quantum dot precursor to be adsorbed in the metal oxide thin layer; (S3) non-adsorbed quantum dot precursor fluid of (S2) is transported and thus recovered to the high pressure storage vessel together with the subcritical fluid or supercritical fluid; and (S4) the subcritical fluid or supercritical fluid is removed from the high pressure reaction vessel, and the quantum dot precursor, adsorbed at (S2), is reacted with a second element which constitutes the quantum dot or a compound comprising the second element.

18 Claims, 12 Drawing Sheets

(56) References Cited

OTHER PUBLICATIONS

Chang et al., "Chemical bath deposition of CdS quantum dots onto mesoscopic $TiO_2$ films for application in quantum-dot-sensitized solar cells," *Applied Physics Letters* (2007) 91: 053503-1-053503-3.

Lee et al., "Efficient CdSe quantum dot-sensitized solar cells prepared by an improved successive ionic layer adsorption and reaction process," *Nano Letters* (2009) 9 (12): 4221-4227.

Jang et al., "Uniform decoration of linker-free quantum dots onto mesoporous $TiO_2$ using liquid carbon dioxide," *Chem. Mater.* (2010) 22: 4350-4352.

Kim et al., "Surface properties of poly[2-(perfluorooctyl)ethyl acrylate] deposited from liquid $CO_2$ high-pressure free meniscus coating," *Macromolecules* (2007) 40: 588-597.

* cited by examiner

FIGURE
4D
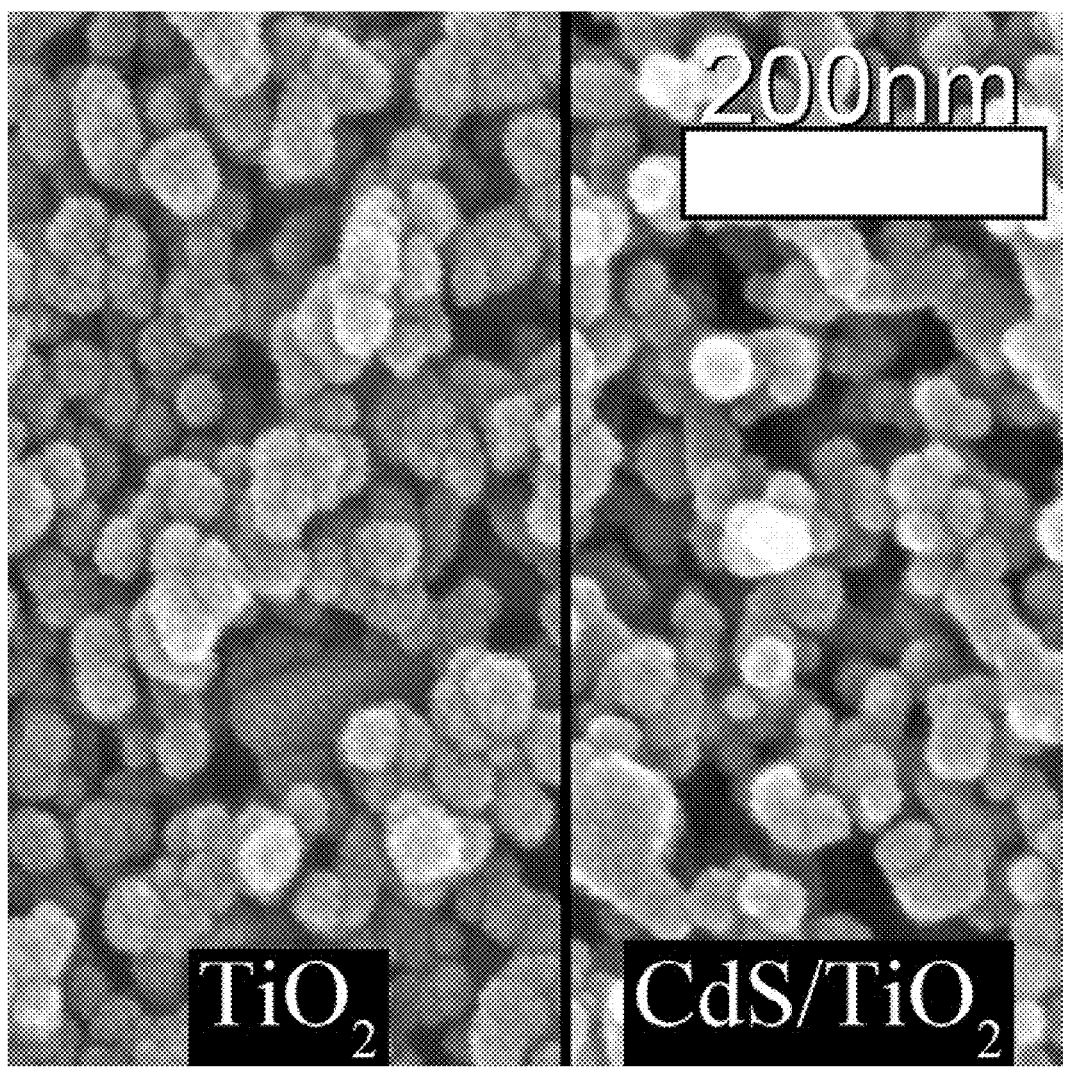

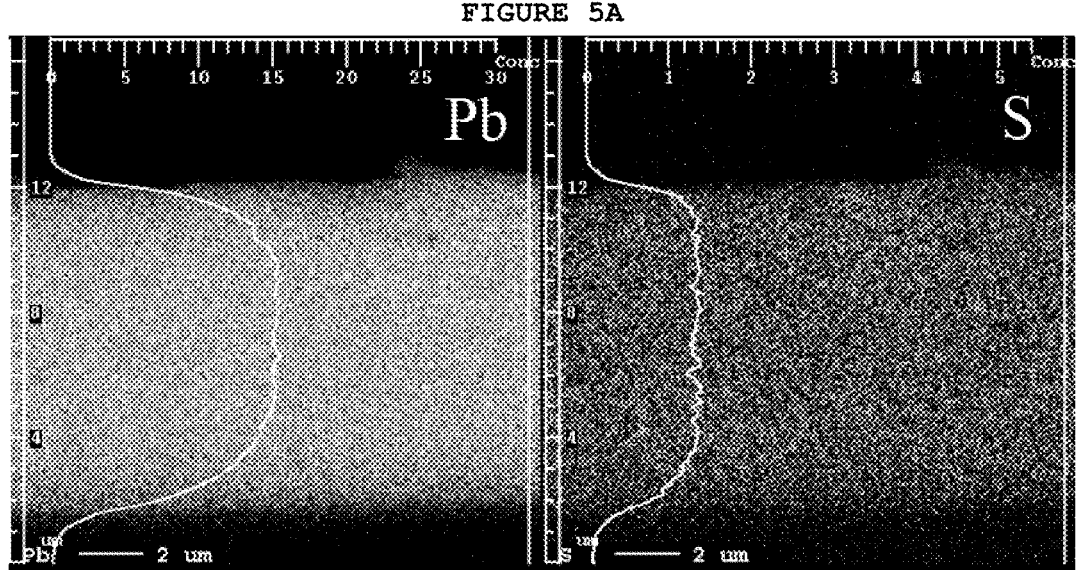

US 8,703,526 B2

FABRICATION METHOD FOR QUANTUM DOT SENSITIZED SOLAR CELL USING SUPERCRITICAL FLUID OR SUBCRITICAL FLUID AND QUANTUM DOT SENSITIZED SOLAR CELL PREPARED THEREBY

CROSS-REFERENCE TO RELATED APPLICATIONS

This application claims priority to Korean Patent Application No. 10-2010-0056568, filed on Jun. 15, 2010, in the Korean Intellectual Property Office, the disclosure of which is incorporated herein by reference in its entirety.

BACKGROUND OF THE INVENTION

1. Field of the Invention

Methods and layers consistent with what is disclosed herein relate to a fabrication method for a quantum dot sensitized solar cell using supercritical fluid or subcritical fluid and a quantum dot sensitized solar cell prepared thereby.

2. Description of the Related Art

In recent years, due to problems such as energy depletion, environmental pollution and global warming associated with the excessive use of fossil fuels, development and production of renewable energy has been urgently required. Solar cell, which produces electric energy by using solar light, has been widely studied and developed as a next generation energy resource. This is mainly because solar cell does not contribute to the global warming, and solar cell only requires solar energy as a source which is limitless. Currently, various types of solar cells, such as crystalline silicon (c-Si) based-solar cell, amorphous silicon (a-Si) solar cell, thin film solar cell based on copper indium gallium diselenide (CIGS) and cadmium telluride (CdTe), polymer solar cell, and dye-sensitized solar cell, have been developed and some types of solar cell including crystalline silicon (c-Si) based-solar cell are commercially available. Among these, dye-sensitized solar cell receives a considerable attention as a next generation solar cell, mainly because it costs much lower than crystalline silicon (c-Si)-based solar cell, and provides relatively high energy conversion efficiency (~11%).

For example, U.S. Pat. No. 4,927,721 discloses a dye-sensitized solar cell, in which dye attached to nanocrystalline semiconductor network of mesoporous or nano-structure, often characterized by its high surface area. The electrons generated from the light-excited dye are transmitted to the nanocrystalline semiconductor network, and it transfers the electrons to the working electrode. The crucial part to determine energy conversion efficiency and cell stability against photodegradation is the dye itself. It is well known that only a limited number of dyes are effective to give high quantum yields. Typically dyes cannot use a wide range of wavelengths of the light reaching the earth. Dyes become unstable when exposed to solar light for an extended period of time due to the photodegradation.

Accordingly, a quantum dot sensitized solar cell, which uses a wider range of light wavelengths and is stable to solar light, has been developed (Mora-Seró, I.; Giménez, S.; Fabregat-Santiago, F.; Gómez, R.; Shen, Q.; Toyoda, T.; Bisquert, J. *Acc. Chem. Res.* 2009, 42, 1848-1857).

Quantum dot has the characteristics of a semiconductor, and is made from at least one compound selected from the group consisting of: a compound consisting of the first element selected from groups 2, 12, 13, and 14 and the second element selected from group 16 of the periodic table; a compound consisting of the first element selected from group 13 and the second element selected from group 15 of the periodic table; and a compound consisting of an element selected from group 14 of the periodic table, which may include, but not limited to, CdS, CdSe, CdTe, CdO, PbS, PbSe, PbTe, ZnS, ZnSe, ZnTe, GaAs, GaN, GaP, GaSb, InP, InSb, AlAs, or AlSb. The quantum dot sensitized solar cell is composed of a material that is capable of absorbing lights of different wavelengths according to the sizes of the quantum dots, and forming electrons and electron holes, and is thus capable of utilizing a light with wider range of wavelengths by adjusting the type or the size of the quantum dot. Furthermore, being composed of inorganic material, the quantum dot sensitized solar cell is capable of providing excellent stability toward the photodegradation. Furthermore, compared to the conventional dye-sensitized solar cell, the quantum dot sensitized solar cell can provide multiple exciton generation (MEG) effect and thus can produce more electrons. Thus, theoretical power conversion efficiency is far greater than that of dye-sensitized solar cell or silicon-based solar cell.

A quantum dot sensitized solar cell is generally fabricated by forming particles including nanoparticles and nanorods of metal oxide and metal oxides such as $TiO_2$, ZnO, $SnO_2$, or $WO_3$ in nano-meter level into a film-like structure with mesoporous or nano-structured morphology, and adsorbing or coating quantum dots onto a surface and interior parts of the metal oxide film-type transparent electrode of electron acceptor, to which the quantum dots are adhered in the size ranging from several nanometers to several tens of nanometers to absorb a wide range of wavelengths and thus increase efficiency of the solar cell. Conventionally, the quantum dots are adsorbed onto the metal-oxide electron acceptor transparent electrode with mesoporous or nano-structure by the method of: dispersing pre-synthesized quantum dots in an organic solvent and introducing a transparent electrode in the organic solvent in which the quantum dots are dispersed; attaching the quantum dots onto the surface of the metal oxide that forms the transparent electrode using appropriate organic linker molecules; or absorbing the first element that constitutes the quantum dot dissolved in an appropriate solvent and then introducing a solution or organic solvent fluid containing the second element. However, the above-mentioned methods have drawbacks. That is, since water or organic solvents used in the above-mentioned methods have a relatively high viscosity, the pre-synthesized quantum dots, and the precursor of the quantum dot are transmitted to the inner pores of the metal oxides of mesoporous or nano-structure at a relatively slow rate, and since water or organic solvents have high surface tension, it is difficult for the quantum dot to be penetrated into the metal oxide transparent electrode of mesoporous or nano-structure, and dispersed and adsorbed into the pores with good uniformity and regularity. Therefore, the adsorption of the quantum dot is more difficult in the interior regions of the metal oxide film with mesoporous or nano-structured morphology (Chang, C. H.; Lee, Y. L. *Appl. Phys. Lett.* 2007, 91, 053503/1-053503/3; Lee, H.; Wang, M.; Chen, P.; Gamelin, d. R.; Zakeeruddin, S. M.; Grätzel, M.; Nazeeruddin, M. K. *Nano Lett.* 2009, 9, 4221-4227).

Accordingly, the inventors of the present application have studied on the quantum dot sensitized solar cell and developed and completed a method of adsorbing a quantum dot onto a conductive thin layer substrate coated with a metal oxide film having mesoporous or nano-structure using supercritical fluid or subcritical fluid, and a quantum dot sensitized solar cell using the same.

SUMMARY OF THE INVENTION

Exemplary embodiments overcome the above disadvantages and other disadvantages not described above. Also, the embodiments are not required to overcome the disadvantages described above, and an exemplary embodiment of the present invention may not overcome any of the problems described above.

In one embodiment, a fabrication method for a transparent electrode for use in a quantum dot sensitized solar cell is provided.

In another embodiment, a transparent electrode for use in a quantum dot sensitized solar cell fabricated by said fabrication method, is provided.

In yet another embodiment, a quantum dot sensitized solar cell comprising said transparent electrode for use in a quantum dot sensitized solar cell, is provided.

In one embodiment, a fabrication method of a transparent electrode coated with a quantum dot may include the steps of (S1) introducing a quantum dot precursor into a high pressure storage vessel and dissolving the quantum dot precursor, comprising a first element which constitutes the quantum dot, using supercritical fluid or subcritical fluid, (S2) transporting the quantum dot precursor solution fluid prepared at S1 into contact with a conductive thin layer substrate made from metal oxide placed inside a high pressure reaction vessel, to thereby causing the quantum dot precursor to be adsorbed on the metal oxide thin layer, (S3) transporting non-adsorbed quantum dot precursor of S2 to the high pressure storage vessel along with the supercritical fluid or subcritical fluid, and (S4) removing the supercritical fluid or subcritical fluid in gaseous state from the high pressure reaction vessel, and causing the quantum dot precursor adsorbed at S2, to be reacted with a compound comprising a second element which constitutes the quantum dot.

BRIEF DESCRIPTION OF THE DRAWINGS

The above and/or other aspects of what is described herein will be more apparent by describing certain exemplary embodiments with reference to the accompanying drawings, in which:

FIG. 4D is a scanning electron microscope (SEM) image of a $TiO_2$ film coated with CdS quantum dot, according to an embodiment;

FIGS. 5A and 5B are photographs representing the result of the electron probe micro analysis with respect to a $TiO_2$ film coated with CdS quantum dot, and a $TiO_2$ film coated with PbS quantum dot, fabricated according to Examples 1 and 2 according to an embodiment;

DETAILED DESCRIPTION OF EXEMPLARY EMBODIMENTS

Figure 1:
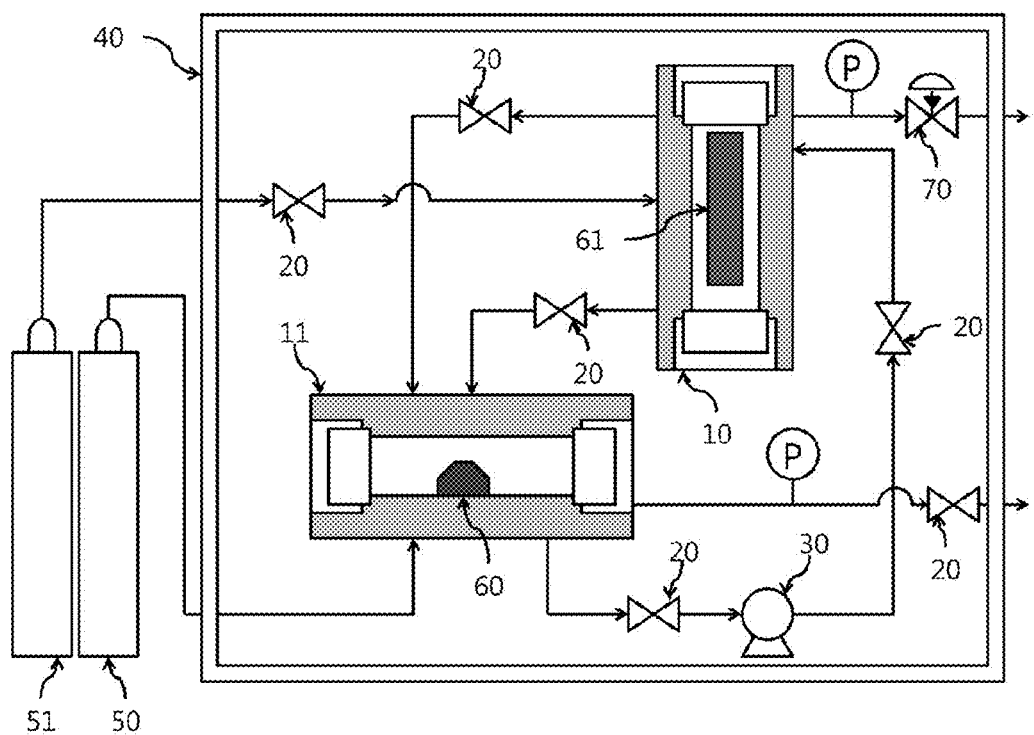
FIG. 1 is a conceptual diagram of an apparatus for fabricating a quantum dot sensitized solar cell according to an embodiment.

Certain exemplary embodiments will now be described in greater detail with reference to the accompanying drawings.

In one embodiment, a fabrication method of a transparent electrode coated with a quantum dot may include the steps of:

(S1) introducing a quantum dot precursor, comprising a first element which constitutes the quantum dot, into a high pressure storage vessel and dissolving the quantum dot precursor using supercritical fluid or subcritical fluid;

(S2) transporting the quantum dot precursor fluid prepared at S1 into contact with a conductive thin layer substrate made from metal oxide placed inside a high pressure reaction vessel, to thereby causing the quantum dot precursor dissolved in the fluid to be adsorbed on the metal oxide thin layer;

(S3) transporting non-adsorbed quantum-dot precursor of S2 to the high pressure storage vessel along with the supercritical fluid or subcritical fluid; and (S4) removing the supercritical fluid or subcritical fluid from the high pressure reaction vessel, and causing the metal oxide thin layer fabricated at S2, on which quantum dot precursor is coated, to be reacted with a compound comprising a second element which constitutes the quantum dot.

In one embodiment, processes at S1 and S2, in which the quantum dot precursor, comprising a first element which constitutes the quantum dot, is dissolved in the supercritical fluid or subcritical fluid and the quantum dot precursor in the dissolved state is adsorbed onto the conductive thin layer substrate made from metal oxide, may be carried out concurrently using one high pressure reactor.

In one embodiment, the non-adsorbed quantum dot precursor of S3 may be recovered by decreasing the degree of solubility of the quantum dot precursor in the supercritical fluid or subcritical fluid by adjusting temperature and pressure of adsorption, thereby or discharging the supercritical fluid or subcritical fluid out of the high pressure reaction vessel.

The fabrication method for a quantum dot-coated sensitized solar cell according to an embodiment will be explained step by step in greater detail below.

In the first step of the fabrication method of a quantum dot-coated sensitized solar cell according to an embodiment, the quantum dot precursor is introduced into a high pressure storage vessel and dissolved using supercritical fluid or subcritical fluid.

The 'supercritical fluid' or 'subcritical fluid' in this description refers to fluid in supercritical and subcritical states by which the quantum dot precursor of S1 is dissolved.

In one embodiment, the supercritical fluid, or more preferably, supercritical carbon dioxide has a relatively high density ranging from about 0.5 to about 0.9 $g/cm^3$, and thus provides excellent solubility of quantum dot precursors. Furthermore, since supercritical carbon dioxide has no surface tension, good wettability and easy penetration into the metal oxide electrode with mesoporous or nano-structure morphology are provided. Furthermore, supercritical carbon dioxide has a viscosity of approximately 0.1 cP (centipoise), which is considerably lower than those (0.5~1.5 cP) of typical organic solvents or water. Accordingly, supercritical carbon dioxide has the properties of easy penetration into the mesoporous or nano-structure of the metal oxide. Additionally, when a coating material is dissolved in supercritical carbon dioxide, due to its lower surface tension and viscosity than those of typical organic solvents or water, the coating material easily penetrates into the mesoporous or nano-structure of the metal oxide. Compared to the supercritical fluid, typical organic solvents or water have a much higher surface tension and a much higher viscosity, and thus hinder the penetration of the coating material into the metal oxide having mesoporous or nano-structure. Accordingly, it is difficult to coat the inner pores of the metal oxide with mesoporous or nano-structure morphology using typical organic solvents or water. Furthermore, since it is possible to recover the quantum dot precursor and supercritical carbon that are discharged after the coating process by controlling the pressure, the process of treating waste liquid, which was otherwise necessary when the typical organic solvents and water are used, is not required after the coating process. Accordingly, the process may be carried out in a more economical and environmentally friendly way when the supercritical fluid is used.

The subcritical fluid, or more preferably, a liquid carbon dioxide has the similar physicochemical properties to those of supercritical carbon dioxide. The density of liquid carbon dioxide ranges from about 0.7 to about 0.8 $g/cm^3$ at atmospheric temperature, and therefore, the liquid carbon dioxide can provide excellent solubility of quantum dot precursors. Furthermore, the viscosity of liquid carbon dioxide is about 0.1 cP at atmospheric temperature, which is considerably lower than those (i.e., 0.5~1.5 cP) of typical organic solvents or water. The surface tension of liquid carbon dioxide is below 5 dyne/cm at atmospheric temperature, which is considerably lower than those (i.e., 20~30 dyne/cm) of typical organic solvents or that (i.e., 72 dyne/cm) of water. By carrying out the coating process using liquid carbon dioxide which requires lower pressure and lower temperature than those of supercritical carbon dioxide requires, more economical way with simpler process to fabricate quantum dot sensitized solar cell can be provided.

The supercritical fluid or subcritical fluid of S1 may desirably be selected from the group consisting of liquid carbon dioxide, supercritical carbon dioxide (critical temperature=31.0° C., critical pressure=73.8 bar), subcritical water, supercritical water (critical temperature=374° C., critical pressure=221 bar), subcritical methane, supercritical methane (critical temperature=−82.4° C., critical pressure=46.0 bar), subcritical ethane, supercritical ethane (critical temperature=32.4° C., critical pressure=48.8 bar), subcritical propane, supercritical propane (critical temperature=95.8° C., critical pressure=42.5 bar), subcritical butane, supercritical butane (critical temperature=155.2° C., critical pressure=38.0 bar), subcritical ethylene, supercritical ethylene (critical temperature=9.5° C., critical pressure=50.8 bar), subcritical propylene, supercritical propylene (critical temperature=91.8° C., critical pressure=46.0 bar), subcritical methanol, supercritical methanol (critical temperature=240.1° C., critical temperature 80.9 bar), subcritical ethanol, supercritical ethanol (critical temperature=243.3° C., critical pressure=61.4 bar), subcritical propanol, supercritical propanol (critical temperature=235.8° C., critical pressure=47.6 bar), subcritical tetrafluoromethane, supercritical tetrafluoromethane (critical temperature=−45.5° C., critical pressure=37.4 bar), subcritical difluoromethane, supercritical difluoromethane (critical temperature=78.4° C., critical pressure=53.8 bar), subcritical trifluoromethane, supercritical trifluoromethane (critical temperature=25.6° C., critical pressure=48.4 bar), subcritical hexafluoroethane, supercritical hexafluoroethane (critical temperature=19.7° C., critical pressure=29.8 bar), subcritical pentafluoroethane, supercritical pentafluoroethane (critical temperature=66.1° C., critical pressure=35.9 bar), subcritical 1,1,1,2-tetrafluoroethane, supercritical 1,1,1,2-tetrafluoroethane (critical temperature=101.0° C., critical pressure=20.6 bar), subcritical difluoroethane, supercritical difluoroethane (critical temperature=78.6° C., critical pressure=58.3 bar), and a mixture thereof, but not strictly limited thereto. Accordingly, any supercritical fluid or subcritical fluid may be applied, provided that the fluid can dissolve the quantum dot precursor. As explained above, the supercritical fluid including the supercritical carbon dioxide have considerably lower surface tension and lower viscosity than those of the typical organic solvents or water, and thus provide good wettability with respect to the metal oxides of mesoporous or nano-structure, easy penetration into the mesopores, and subsequently uniform coating.

For example, if carbon dioxide is used as a solvent, subcritical carbon dioxide of S1 has the pressure and temperature not exceeding the critical pressure and temperature of the carbon dioxide, while the supercritical carbon dioxide has the pressure and temperature exceeding the critical pressure and temperature of the carbon dioxide. Preferably, subcritical carbon dioxide applied in one embodiment may dissolve a quantum dot precursor at temperature of 31.0° C. or below, and pressure of 73.8 bar or below, and more preferably, subcritical carbon dioxide is in the mixed state of gas and liquid. Supercritical carbon dioxide may dissolve a quantum dot precursor at temperature of 31.0° C. or above, and pressure of 73.8 bar or above.

The temperature and pressure required for the high pressure storage vessel to maintain the supercritical fluid in the state at S1 may be determined within a range in which the quantum dot precursor is dissolved at a temperature or at a pressure exceeding the critical temperature and the critical pressure of the supercritical fluid. For example, if supercritical carbon dioxide is used, the temperature may range from about 31° C. to about 200° C., and preferably from about 40° C. to about 100° C., and the pressure may range from about 73.8 bar to about 500 bar, and preferably from about 73.8 bar to about 300 bar. If the temperature is below 31° C. and the pressure is below 73.8 bar, (the carbon dioxide is not supercritical state) the solubility of a quantum dot precursor in supercritical carbon dioxide deteriorates, and this sequentially decreases the amount of coating material adsorption in the metal oxide and decreases efficiency of photo-conversion of the quantum dot sensitized solar cell. In contrast, if the temperature exceeds 200° C. and the pressure exceeds 500 bar, the economic efficiency to fabricate the quantum dot sensitized solar cell degrades, since it is necessary to maintain the high temperature and the high pressure.

Furthermore, the temperature and pressure required for the high pressure storage vessel to maintain the subcritical fluid in the state at S1 may be determined within a range in which the quantum dot precursor is dissolved at a temperature or at a pressure below the critical temperature or the critical pressure of the subcritical fluid. In order to maintain the subcritical fluid used at S1, more particularly, to maintain the state of liquid carbon dioxide, the temperature of the high pressure reaction vessel where the liquid is produced to dissolve a quantum dot precursor, may range from about 0° C. to about 30° C., or preferably from about 5° C. to about 25° C., and the pressure may range from about 30 bar to about 500 bar, or preferably from about 50 bar to about 300 bar. If the temperature is below 0° C., economic efficiency to fabricate the quantum dot sensitized solar cell deteriorates since it is necessary to add a cooling process to maintain temperature at a low degree, and if the pressure is below 30 bar, the photo-conversional efficiency of the quantum dot sensitized solar cell deteriorates since the solubility of the quantum dot precursor in liquid carbon dioxide deteriorates and thus the amount of the quantum dot precursor adsorbed in the metal oxide decreases. If the temperature exceeds 30° C. and the pressure of adsorption exceeds 500 bar, economic efficiency again to fabricate the quantum dot sensitized solar cell deteriorates since it is necessary to maintain the temperature and pressure at high degrees.

The term 'quantum dot precursor' in S1 refers to a metal compound which can be dissolved in the subcritical fluid or supercritical fluid, and preferably, it is an organometallic compound in which ligands consisting of organic substances binding to one or more metals. The quantum dot precursor may have a form in which a metal such as cadmium (Cd), gallium (Ga), indium (In), plumbum (Pb), copper (Cu), or zincum (Zn) binding to acetylacetonate (2,4-pentanedionato), hexafluoroacetylacetonate (1,1,1,5,5,5-hexafluoro-2,4-pentanedionato), tetramethyl-3,5-heptanedionate, cyclooctadiene, methyl, ethyl, acetate, fluoride, chloride, iodine, nitrate, or carbonate group.

The quantum dot precursor may include, but not limited to, bis(1,1,1,5,5,5-hexafluoro-2,4-pentanedionato)cadmium(II) ($Cd(hfac)_2$), bis(2,4-pentanedionato)cadmium(II), (Cd $(acac)_2$,) cadmium(II) acetate($Cd(OOCCH_3)_2$), cadmium(II) bromide, cadmium(II) chloride, cadmium(II) fluoride, cadmium(II) cyclohexabutyrate, cadmium(II) iodide, cadmium (II) nitrate, cadmium(II) perchlorate ($Cd(ClO_4)_2$), dimethyl cadmium(II) (($CH_3)_2Cd$), cadmium(II) carbonate ($CdCO_3$), tris(2,4-pentanedionato)gallium(III) ($Ga(acac)_3$), tris(1,1,1, 5,5,5-hexafluoro-2,4-pentanedionato)gallium(III) (Ga $(hfac)_3$), gallium(III) bromide, gallium(III) chloride, gallium (III) fluoride, gallium(III) iodide, gallium(III) nitrate, triethyl gallium(III), diethylamide gallium(III), gallium(III)$_{2,4}$-pentadionate ($Ga(CH_3C_3H_4O_2)_3$), gallium(III) perchlorate (Ga $(ClO_4)_3$), tris(2,2,6,6-tetramethyl-3,5-heptanedionato)gallium(III) ($Ga(TMHD)_3$), bis(2,4-pentanedionato)indium(III) ($In(acac)_3$), tris(1,1,1,5,5,5-hexafluoro-2,4-pentanedionato) indium(III) ($In(hfac)_3$), indium(III) acetate($In(OOCCH_3)_3$), indium(III) bromide, indium(III) chloride, indium(III) fluoride, indium(III) iodide, indium(III) nitrate, indium(III) perchlorate ($In(ClO_4)_3$), indium(III) trifluoroacetate(In $(OOCCF_3)_3$), indium(III) trifluoroacetylacetonate (In $(tfac)_3$), trymethyl indium(III), tris(2,2,6,6-tetramethyl-3,5-heptanedionato)indium(III) ($In(TMHD)_3$), bis(2,4-pentanedionato)lead(II) ($Pb(acac)_2$), bis(1,1,1,5,5,5-hexafluoro-2,4-pentanedionato)lead(II) ($Pb(hfac)_2$), tris(2,2,6,6-tetramethyl-3,5-heptanedionato)lead(II) ($Pb(TMHD)_2$), lead (II) acetate($Pb(OOCCH_3)_2$), lead(II) bromide, lead(II) chloride, lead(II) fluoride, lead(II) iodide, lead(II) 2,4-pentanedionate ($Pb(CH_3C_3H_4O_2)_2$), lead(II) trifluoroacetate(Pb $(OOCCF_3)_2$), bis(1,1,1,5,5,5-hexafluoro-2,4-pentanedionato)copper(II) ($Cu(hfac)_2$), bis(2,4-pentanedionato)copper (II) ($Cu(acac)_2$), Bis(6,6,7,7,8,8,8-heptafluoro-2,2-dimethyl-3,5-octanedionate)copper(II) ($Cu(FOD)_2$), tris(2,2,6,6-tetramethyl-3,5-heptanedionato)copper(II) ($Cu(TMHD)_2$), copper(II) bromide, copper(II) Chloride, copper(II) fluoride, copper(II) ethylacetoacetate, copper(II) perchlorate (Cu $(ClO_4)_2$), copper(II) tetrafluoroborate ($Cu(BF_4)_2$), copper(II) trifluoroacetylacetate($Cu(tfac)_3$), bis(2,4-pentanedionato) zinc(II) ($Zn(acac)_2$), bis(1,1,1,5,5,5-hexafluoro-2,4-pentanedionato)zinc(II) ($Zn(hfac)_2$), tris(2,2,6,6-tetramethyl-3, 5-heptanedionato)zinc(II) ($Zn(TMHD)_2$), dimethylzinc (Zn $(CH_3)_2$), diethylzinc ($Zn(C_2H_5)_2$), zinc(II) bromide, zinc(II) chloride, zinc(II) fluoride, or zinc(II) tetrafluoroborate (Zn $(BF_4)_2$).

The process at S2 includes transporting the quantum dot precursor solution obtained at S1 into contact with the conductive thin layer substrate made from metal oxide with mesoporous or nano-structure introduced into a high pressure reaction vessel so that the quantum dot precursor dissolved in the fluid is adsorbed onto the surface of the metal oxide thin layer.

The metal oxide at S2 may include $TiO_2$, ZnO, $SnO_2$, or $WO_3$, and the thin layer substrate may be made from polymer film including, but not limited to, indium tin oxide (ITO), fluorine dopped tin oxide (FTO), transparent substrate coated with carbon nanotube thereon, and PEDOT/PSS(poly((3,4-Ethylenedioxythiophene/Poly(4-styrene sulfonic acid)).

The metal oxide thin layer substrate at S2 may be fabricated by depositing metal oxide particles ranging in size from about 10 nm to about 500 nm, on top of the conductive plate-shaped transparent substrate which is rinsed with ultrasonic waves, alcohol and ozone treatment, forming a thin layer of the metal oxide layer in thickness of 1~30 μm, and then removing organic substances included in the paste and the impurities generated during the process.

With the fabrication method according to one embodiment, the condition for adsorption at S2 may be determined within a range in which a quantum dot precursor is dissolved at a temperature and a pressure exceeding the critical temperature and the critical pressure of the supercritical fluid, if the supercritical fluid is used as a solvent. For example, if the supercritical carbon dioxide is used as the solvent, the temperature may range from about 31° C. to about 200° C., or preferably from about 40° C. to about 100° C., and the pressure may range from about 73.8 bar to about 500 bar, or preferably from about 73.8 bar to about 300 bar. If the temperature is below 31° C., and the pressure is below 73.8 bar, (the carbon dioxide is not supercritical state) the solubility of the quantum dot precursor in supercritical carbon dioxide deteriorates so that the amount of quantum dot precursor adsorbed onto the metal oxide layer decreases and the photo-conversional efficiency of the quantum dot sensitized solar cell deteriorates. If the temperature exceeds 200° C. and the pressure exceeds 500 bar, economic efficiency to fabricate the quantum dot sensitized solar cell deteriorates, since it is necessary to maintain the temperature and pressure at high degrees.

If the subcritical fluid is used as the solvent at S2, the condition for adsorption may be determined within a range in which a quantum dot precursor is dissolved at a temperature and pressure below the critical temperature and the critical pressure. For example, if subcritical carbon dioxide, and in particularly, if liquid carbon dioxide is used as a solvent, the temperature may range from about 0° C. to about 30° C., or preferably from about 5° C. to about 25° C., and the pressure may range from about 30 bar to about 500 bar, or preferably, from about 50 bar to about 100 bar. If the temperature is below 0° C., the process is uneconomical since it is necessary to add a cooling process to maintain temperature at low degrees, and if the pressure is below 30 bar, solubility of the quantum dot precursor within liquid carbon dioxide deteriorates, so that the amount of quantum dot precursor adsorbed onto the metal oxide layer decreases and the photo-conversional efficiency of the quantum dot sensitized solar cell deteriorates. If the temperature exceeds 30° C. and the pressure exceeds 500 bar, the economic efficiency to fabricate the quantum dot sensitized solar cell also decreases, since it is necessary to maintain temperature and pressure at high degrees.

The contact time between the quantum dot precursor dissolved in the subcritical fluid or supercritical fluid and the conductive thin layer substrate electrode made from the metal oxide, may range from about 1 minute to about 48 hours, or preferably, from about 10 minutes to about 24 hours. If the contact time is shorter than 1 minute, too short time is given for the quantum dot precursor to penetrate into the metal oxide with mesoporous or nano-structure morphology, in which case, uniform contact with the mesopores of the metal oxide is not guaranteed. If the contact time is longer than 48 hours, productivity deteriorates due to a long processing time.

As for the next process, at S3, non-adsorbed quantum dot precursor solution of S2 is recovered, by being transported to the high pressure storage vessel along with the subcritical fluid or supercritical fluid.

The non-adsorbed quantum dot precursor dissolved in the recovered subcritical fluid or supercritical fluid of the high pressure storage vessel may be transferred back to the high pressure reaction vessel to be re-used to produce quantum dot. It is preferable to adjust the amount of quantum dot precursor introduced into the high pressure reaction vessel appropriately in consideration of the amount of the non-adsorbed quantum dot precursor recovered in the high pressure storage vessel. The introduction of the subcritical fluid or supercritical fluid into the high pressure reaction vessel can be performed at the same pressure as that of the high pressure storage vessel to facilitate the transport of the fluid.

At S4, the fluid is removed by dropping the pressure of the high pressure reaction vessel, and the metal oxide thin layer produced at S2 in which the quantum dot precursor is adsorbed, is reacted with a compound comprising a second element which constitutes the quantum dot.

The fluid in the high pressure reaction vessel may be removed by a decompression device, and the quantum dot precursor is reacted with a compound including the second element that constitutes the quantum dot in the high pressure reaction vessel at temperature ranging from about 0° C. to about 500° C., for a duration spanning from about 1 minute to about 24 hours. As a result, quantum dot is synthesized by the reaction between the quantum dot precursor in which is adsorbed on the surface of the metal oxide thin layer and the compound containing the second element of the quantum dot. If temperature of the high pressure reaction vessel is below 0° C., the reactivity can degrade so that low crystalline quantum dot can be generated and photo-conversional efficiency of the solar cell can degrade. If the temperature exceeds 500° C., since it is necessary to maintain high temperature, economic efficiency to fabricate quantum dot sensitized solar cell can degrade. If the reaction time is below 1 minute, too short reaction may cause the low crystalline quantum dot to be generated, thereby degrading the photo-conversional efficiency of the solar cell. If the reaction time exceeds 24 hours, the long processing time degrades the productivity.

As for the compound containing the second element that constitutes the quantum dot at S4, the compound may preferably be in gaseous state and include one of sulfur, selenium, and tellurium, or more preferably, the compound at S4 may be $H_2S$, $H_2Se$ or $H_2Te$.

According to one embodiment, a transparent electrode for use in sensitized solar cell coated with quantum dot, fabricated with said fabrication method, is provided.

In another embodiment, a quantum dot sensitized solar cell having said transparent electrode, is also provided.

According to the embodiments, the quantum dot precursor, dissolved in the subcritical fluid or supercritical fluid, is adsorbed in the metal oxide having mesoporous or nano-structure morphology, and reacted with a compound containing the second element that constitutes the quantum dot, so that the quantum dot is coated uniformly not only at the surface, but also in the inner pores of the metal oxide layer. As a result, a quantum dot sensitized solar cell with high photo-conversional efficiency can be provided. Furthermore, after the fabrication of the solar cell, the subcritical fluid or supercritical fluid containing the quantum dot precursor can be recovered, so that increased economic efficient and environmentally-friendly process can be provided to the fabrication of a quantum dot sensitized solar cell.

FIG. 1 illustrates an example of an apparatus for fabricating a transparent electrode for use in a sensitized solar cell on which quantum dot is coated according to an embodiment. In one embodiment, the apparatus for fabricating the transparent electrode for use in the sensitized solar cell coated with the quantum dot may include a high pressure reaction vessel 10, a high pressure storage vessel 11, isolation valves 20, a high pressure pump 30, an air thermostat 40, and a decompression device 70. The method of coating quantum dot on a transparent electrode for use in a sensitized solar cell using subcritical fluid or supercritical fluid, and recovering and recycling non-adsorbed quantum dot precursor according to an embodiment will be explained in detail below with reference to FIG. 1.

First, using the air thermostat 40, the temperature of the high pressure storage vessel 11 and the high pressure reaction vessel 10 is adjusted, and the quantum dot precursor 60 is introduced into the high pressure storage vessel 11. After that, subcritical fluid or supercritical fluid is introduced from the fluid storage tank 50 and dissolving the quantum dot precursor. The metal oxide thin film substrate 61 is loaded in the high pressure reaction vessel 10 and the high pressure reaction vessel is pressurized with supercritical fluid or subcritical fluid. Next, using the high pressure pump 30, the solution of the quantum dot precursor 60 is transferred from the high pressure storage vessel 11 to the high pressure reaction vessel 10 so that the quantum dot precursor 60 dissolved within the subcritical fluid or supercritical fluid is brought into contact with the thin layer substrate 61 for a predetermined time period and adsorbed therein. After that, non-adsorbed quantum dot precursor 60, which is still dissolved within the subcritical fluid or supercritical fluid, is transported back to the high pressure storage vessel 11. After the subcritical fluid or supercritical fluid with non-adsorbed precursor dissolved therein is transported back to the high pressure storage vessel 11, the high pressure reaction vessel 10 is isolated from the other parts of the system by closing isolation valves 20. Next, the fluid in the high pressure reaction vessel 10 is discharged out using the decompression adjusting device 70 until it reaches ambient pressure. After that, the compound containing the second element of the quantum dot in the second element compound storage tank 51 is introduced into the high pressure reaction vessel 10, and the temperature is adjusted using the air thermostat 40. Through reaction between the quantum dot precursor 60 adsorbed on the metal oxide thin layer and the second element compound, a transparent electrode on which the quantum dot is coated, is fabricated.

Certain embodiments of the present inventive concept will be explained in greater detail below. However, the embodiments are described only for illustrate purpose, and should not be understood as limiting the present inventive concept.

EXAMPLE 1

Fabrication of Quantum Dot-Coated Transparent Electrode for Use in a Sensitized Solar Cell 0.025 g of paste of titanium dioxide ($TiO_2$) nanoparticles with a size of 12 nm in diameter in a mixed solvent of ethyl cellulose and terpineol was coated as a layer of 10 μm thickness on a conductive plate-type transparent substrate which is rinsed with ultrasonic waves, alcohol and ozone. Temperature was elevated gradually from room temperature at a rate of 5° C./min and calcination was conducted at 500° C. for 40 minutes. Accordingly, as the organic solvent and impurities were removed, a titanium dioxide thin layer substrate with mesoporous morphology was fabricated. The fabricated metal oxide thin layer substrate was placed in a high pressure reaction vessel (20 ml) and the temperature was maintained at 15° C. The gaseous impurities present in the reactor were removed by purging with high purity nitrogen and then the reactor was pressurized with gaseous carbon dioxide at 45 bar. A high pressure storage vessel, 26 ml in volume, was adjusted to the temperature of 15° C., and 0.0844 g of Cd(hfac)$_2$, as the quantum dot precursor, was introduced into the high pressure storage vessel. After 21.15 g of liquid carbon dioxide was introduced to the high pressure storage vessel at a pressure of 45 bar, Cd(hfac)$_2$ was dissolved in liquid carbon dioxide for one hour. The liquid carbon dioxide with the quantum dot precursor dissolved therein is transported from the high pressure storage vessel to the high pressure reaction vessel in which the $TiO_2$ film-coated transparent electrode with mesoporous structure is placed, by using a high pressure circulation pump, so that the quantum dot precursor dissolved in liquid carbon dioxide was contacted and adsorbed on the $TiO_2$ film-coated transparent electrode. After three hours, the liquid carbon dioxide and non-adsorbed Cd(hfac)$_2$ were transported back into the high pressure storage vessel. The gaseous carbon dioxide in the high pressure reaction vessel was slowly vented to atmospheric pressure. After that, hydrogen sulfide ($H_2S$) was flowed at the rate of 15 cc/min so that $H_2S$ was reacted with Cd(hfac)$_2$ adsorbed on the $TiO_2$ thin layer. As a result, the CdS quantum dot-coated transparent electrode for use in solar cell was fabricated.

EXAMPLE 2

Fabrication of Quantum Dot-Coated Transparent Electrode for Use in a Solar Cell Except for using Pb(hfac)$_2$ instead of Cd(hfac)$_2$ as the quantum dot precursor, the PbS quantum dot-coated transparent electrode for use in a solar cell was fabricated in the same manner as that of Embodiment 1.

EXAMPLE 3

Fabrication of Quantum Dot-Coated Transparent Electrode for Use in a Solar Cell Except for using Cu(hfac)$_2$ instead of Cd(hfac)$_2$ as the quantum dot precursor, the CuS quantum dot-coated transparent electrode for use in a solar cell was fabricated in the same manner as that of Embodiment 1.

COMPARATIVE EXAMPLE 1

Fabrication of Quantum Dot-Coated Transparent Electrode for Use in a Solar Cell Using an Organic Solvent Except for using acetone instead of liquid carbon dioxide as the coating solvent at 15° C. and 1 bar, the CuS quantum dot-coated transparent electrode for use in a solar cell was fabricated in the same manner as that of Embodiment 1.

EXAMPLE 4

Fabrication of Quantum Dot-Coated Transparent Electrode for Use in a Solar Cell An electrolyte inlet was drilled through a plate type conductive transparent substrate, and the substrate was rinsed with alcohol containing hydrochloric acid. The substrate was then heated at 400° C. for 15 minutes to drive off organic impurities. $H_2PtCl_6$ was dissolved in ethanol at a concentration of 2 mg/ml, and one drop thereof was applied on a conductive surface of the substrate. The temperature of the furnace was increased from room temperature at a rate of 5° C./min, and calcinations was done at 400° C. for 15 minutes, so that Pt was coated as the counter electrode. The titanium dioxide ($TiO_2$) thin layer substrate containing CdS fabricated by Example 1 was then removed, leaving only an area of 0.5 cm×0.5 cm. A high temperature fusing gasket, which was 60 μm in thickness and 1 mm in width, was used, a boundary of 15 mm×15 mm was constructed around the thin film, the counter electrode was covered, and the thin film was pressed at 90° C. for 10 seconds. As a result, the $TiO_2$ thin layer substrate containing CdS was fixed to the counter electrode. Through the electrolyte inlet, which was drilled during the preparation of the counter electrode, electrolyte was introduced, and the electrolyte inlet was covered by the high temperature fusion gasket which was 20 μm in thickness. The thin glass substrate was placed on top of the high temperature fusion gasket to seal the interior. Accordingly, the quantum dot sensitized solar cell was fabricated.

EXPERIMENT 1

Analysis of Quantum Dot-Coated Transparent Electrode

In order to analyze the quantum dots coated on the $TiO_2$ thin layer substrate, and also the depth profiles, particle size and thickness of the layer, X-ray diffraction (XRD, Rigaku Company, 'MiniFlex'), X-ray photoelectron spectroscopy (XPS, ULVAC company, 'PHI 5800 ESCA'), transmission electron microscopy (TEM, FEI company, 'Tecnai G2 F30 S-TWIN'), UV-Vis spectrophotometer (UV-vis, Varian Company, 'Cary 5000'), and electron probe micro-analyzer (EPMA, JEOL company, 'JXA-8500F') were used, and the results are shown in FIGS. 2 to 7.

Figure 2:
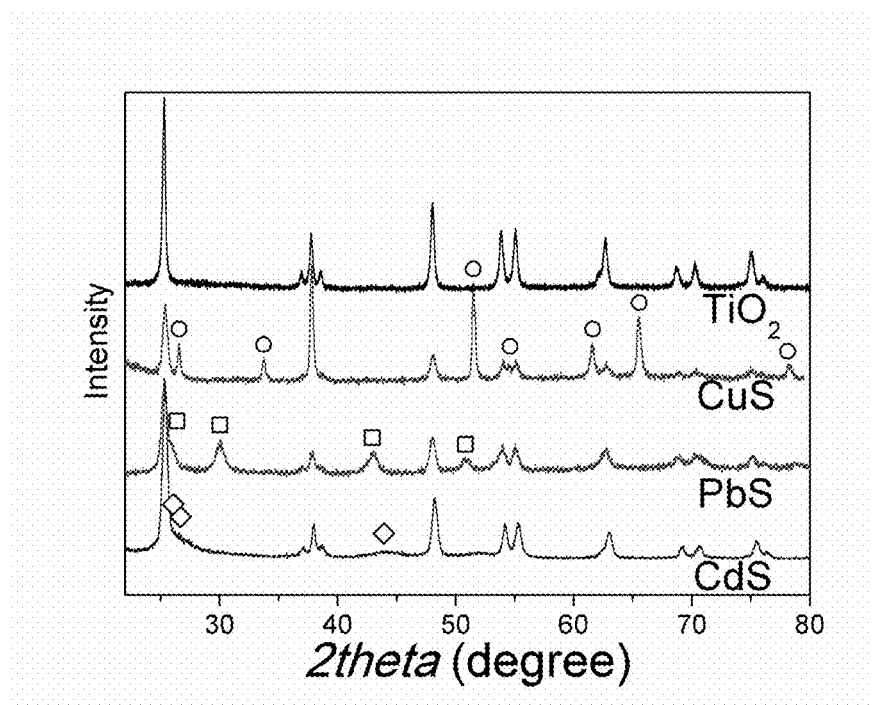
FIG. 2 is a graphical representation of X-ray diffraction patterns of a $TiO_2$ film coated with CdS quantum dot, a $TiO_2$ film coated with PbS quantum dot, and a $TiO_2$ film coated with CuS quantum dot, fabricated according to Examples 1, 2 and 3 according to an embodiment.

FIG. 2 is a graphical representation of X-ray diffraction patterns of the $TiO_2$ film coated with CdS quantum dot, the $TiO_2$ film coated with PbS quantum dot, and the $TiO_2$ film coated with CuS quantum dot, fabricated according to Examples 1, 2 and 3 according to an embodiment. The XRD patterns of the $TiO_2$ layer on top of the glass corresponds to that of the anatase type $TiO_2$ layer, and the XRD spectra of CdS/$TiO_2$/glass, PbS/$TiO_2$/glass, and CuS/$TiO_2$/glass layers all contain $TiO_2$ peaks and metal sulfide peaks. The metal sulfide peaks correspond to CdS, CuS and PbS.

Figure 3:
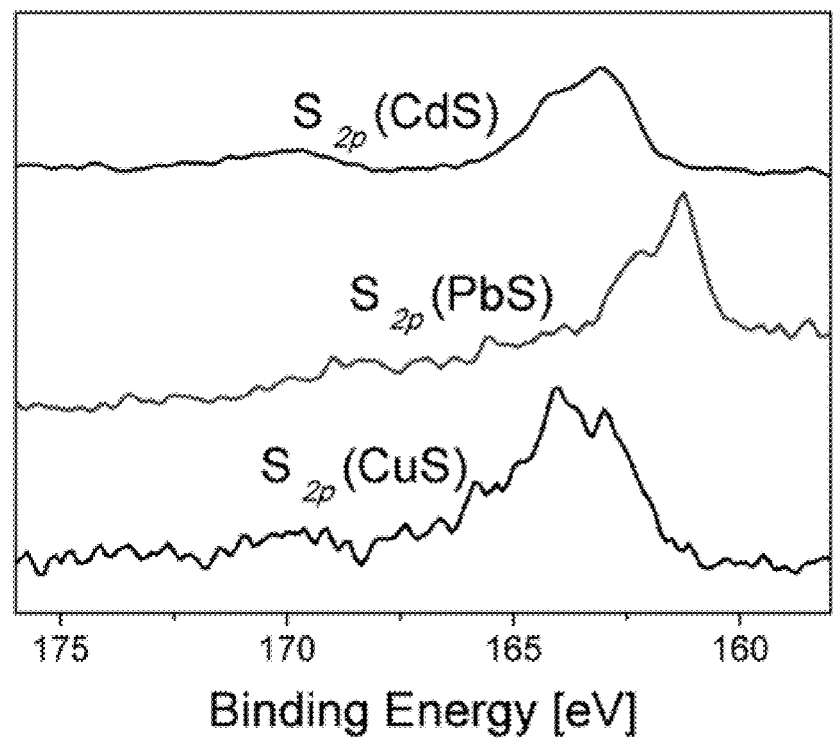
FIG. 3 is a graphical representation of high-resolution X-ray photoelectron spectra of a $TiO_2$ film coated with CdS quantum dot, a $TiO_2$ film coated with PbS quantum dot, and a $TiO_2$ film coated with CuS quantum dot, fabricated according to Examples 1, 2 and 3 according to an embodiment.
Figure 3:
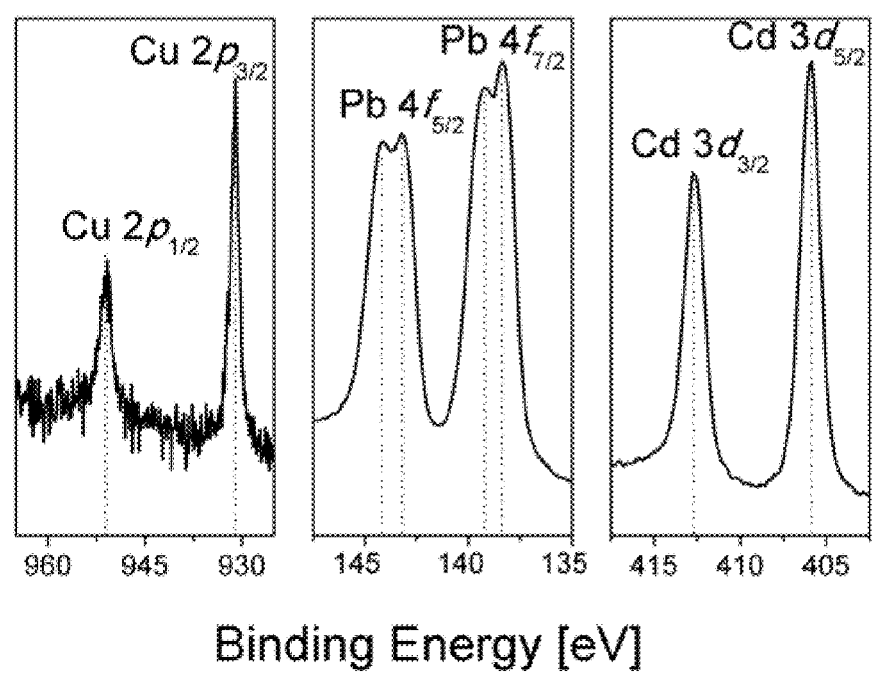

FIG. 3 is a graphical representation of high-resolution X-ray photoelectron spectra of the $TiO_2$ film coated with CdS quantum dot, the $TiO_2$ film coated with PbS quantum dot, and the $TiO_2$ film coated with CuS quantum dot, fabricated according to Examples 1, 2 and 3 according to an embodiment. In each spectrum ($S_{2p}$), the respective peaks of: Cu ($2p_{1/2}$ at 951.1 eV and $2p_{3/2}$ at 931.1 eV); Pb ($4f_{5/2}$ at 143.1 eV and 144.2 eV and $4f_{7/2}$ at 138.1 eV and 139.3 eV); and Cd ($3d_{3/2}$ at 413.1 eV and $3d_{5/2}$ at 406.4 eV) correspond to the binding energy of the metal sulfide as illustrated. Furthermore, the quantum dots of CdS, CuS and PbS have metal and sulfide at a mole ratio of 1:1, thereby suggesting that the deposition is completed chemical quantitatively.

Figure 4A:
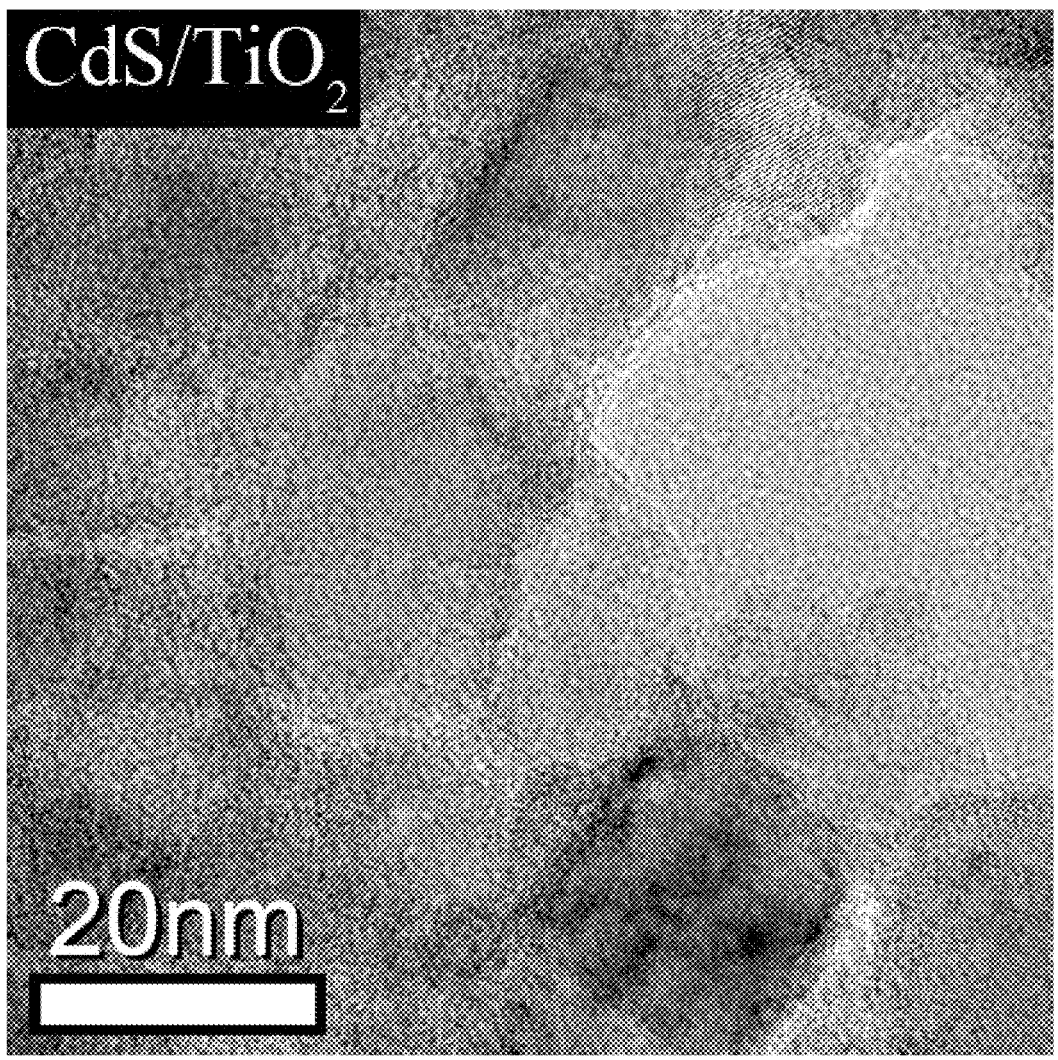
FIGS. 4A to 4C are high resolution transmission electron microscope (TEM) images of a $TiO_2$ film coated with CdS quantum dot, a $TiO_2$ film coated with PbS quantum dot, and a $TiO_2$ film coated with CuS quantum dot, fabricated according to Examples 1, 2 and 3 according to an embodiment.
Figure 4B:
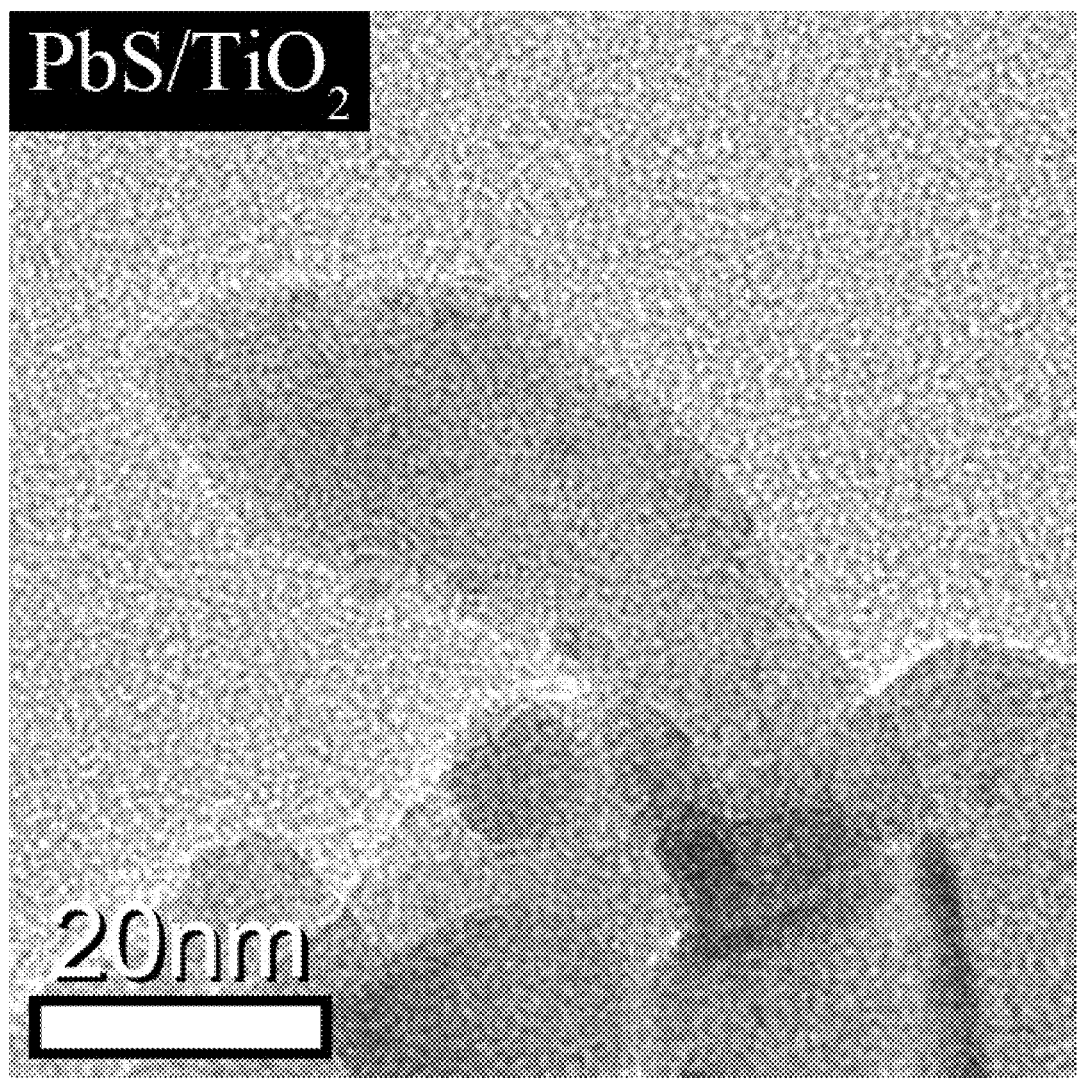
Figure 4C:
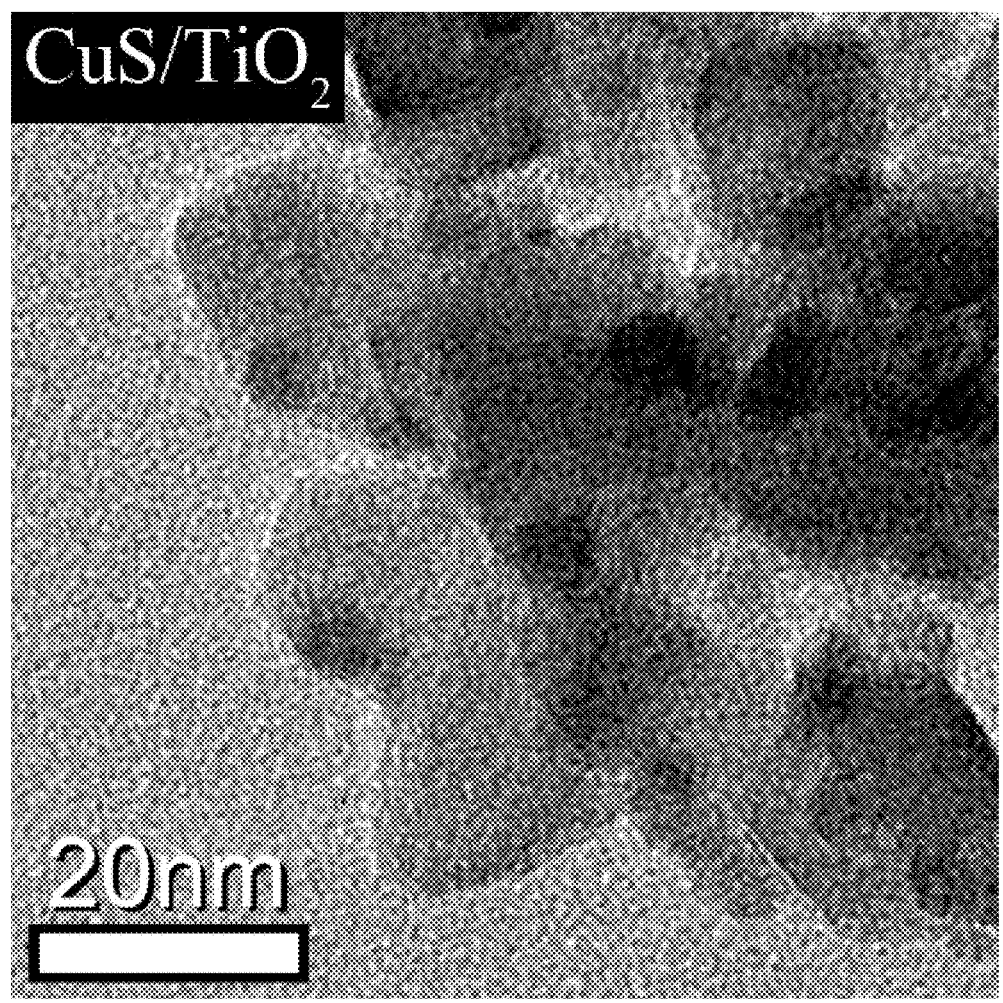

FIGS. 4A to 4C are high resolution transmission electron microscope (TEM) images of the $TiO_2$ film coated with CdS quantum dot, the $TiO_2$ film coated with PbS quantum dot, and the $TiO_2$ film coated with CuS quantum dot, fabricated according to Examples 1, 2 and 3 according to an embodiment, and FIG. 4D is a scanning electron microscope (SEM) image of the $TiO_2$ film coated with CdS quantum dot, according to an embodiment. Referring to the high resolution TEM images of FIGS. 4A to 4C, it is noticeable that the quantum dot is comprised of single crystal grain which is 2-5 nm in diameter. Furthermore, the SEM images (of FIG. 4D) do not show the quantum dot, thereby suggesting that there has not been formation of large size metal sulfide particles by aggregating of the neighboring quantum dots.

Figure 5B:
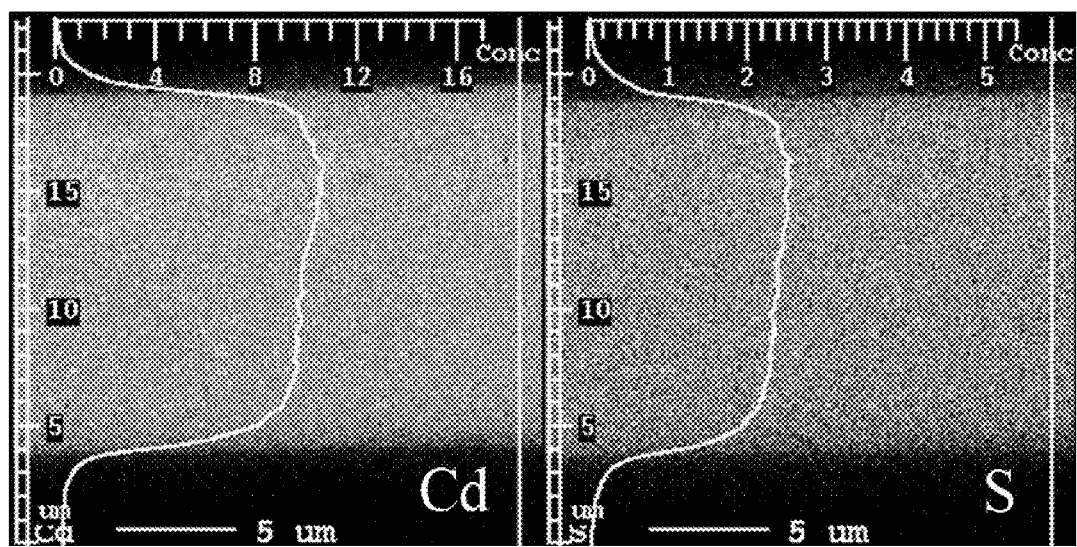

FIGS. 5A and 5B are photographs representing the result of the electron probe micro analysis with respect to the $TiO_2$ film coated with CdS quantum dot and the $TiO_2$ film coated with PbS quantum dot, fabricated according to Examples 1 and 2 according to an embodiment. Referring to FIGS. 5A and 5B, it is noticeable that Pd, Cd or S is coated across the entire $TiO_2$ layer at a uniform concentration from the surface to the bulk layer.

Figure 6:
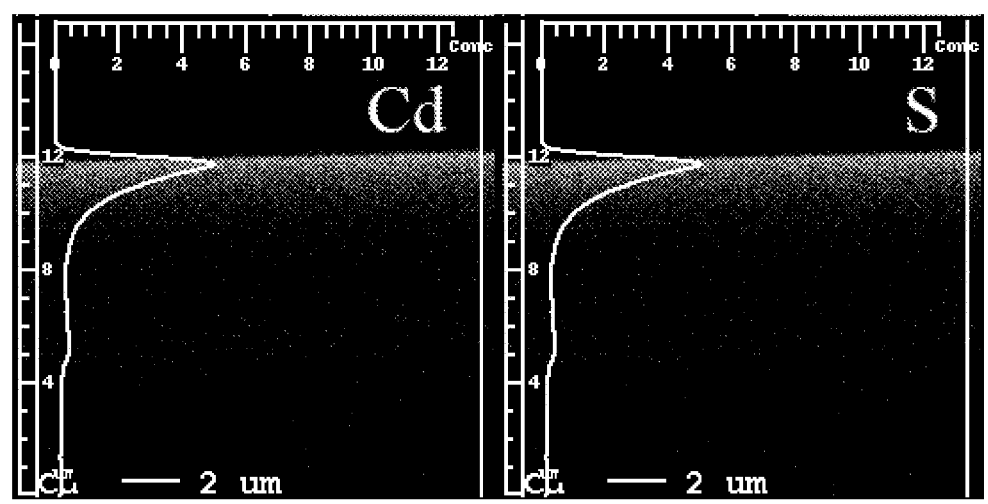
FIG. 6 is a photograph representing the result of electron probe micro analysis on a $TiO_2$ film coated with CdS quantum dot fabricated using acetone of Comparative Example 1 according to an embodiment.

FIG. 6 is a photograph representing the result of electron probe micro analysis on the $TiO_2$ film coated with CdS quantum dot fabricated using acetone of Comparative Example 1 according to an embodiment. Referring to FIG. 6, Cd and S are distributed only near the top surface region of the $TiO_2$ thin layer, i.e., there is no Cd or S distribution inside the $TiO_2$ bulk layer. Accordingly, by using acetone instead of liquid carbon dioxide as the solvent, which has the relatively higher surface tension (24.3 dyne/cm at 15° C.) and higher viscosity (0.34 cP at 15° C.), CdS can be coated exclusively only at the top surface of the $TiO_2$ film with mesoporous structure, and therefore, does not exist inside the film.

Figure 7:
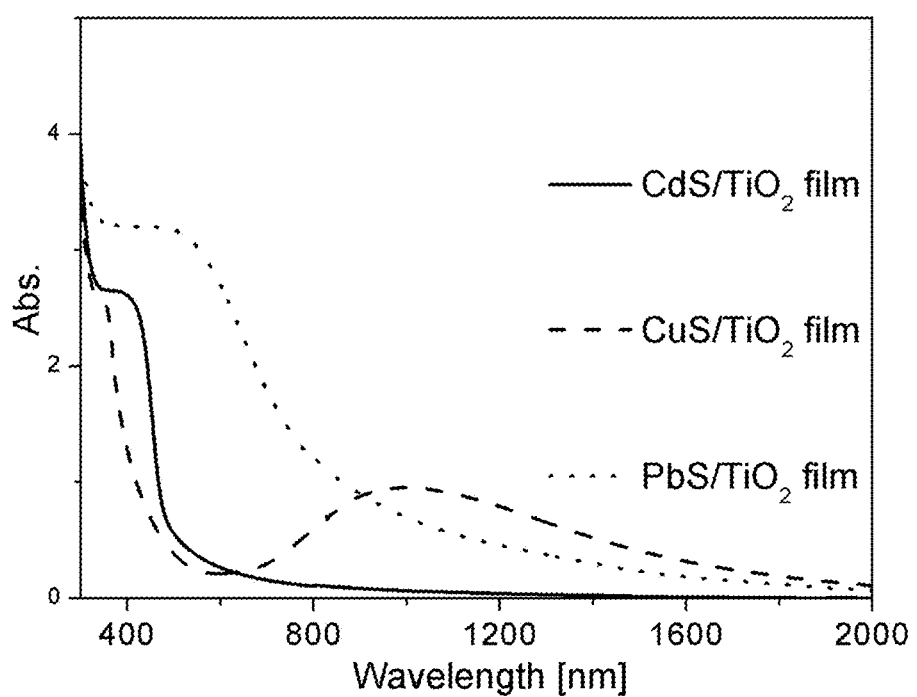
FIG. 7 is a graphical representation plotting UV (ultraviolet)-visible absorption analysis of a $TiO_2$ film coated with CdS quantum dot, a $TiO_2$ film coated with PbS quantum dot, and a $TiO_2$ film coated with CuS quantum dot, fabricated according to Examples 1, 2 and 3 according to an embodiment.

FIG. 7 is a graphical representation plotting UV (ultraviolet)-visible absorption analysis of the $TiO_2$ film coated with CdS quantum dot, the $TiO_2$ film coated with PbS quantum dot, and the $TiO_2$ film coated with CuS quantum dot, fabricated according to Examples 1, 2 and 3 according to an embodiment. Referring to FIG. 7, CuS is excited by the light with a relatively shorter wavelength than when CuS is formed in a bulk-like shape, and in this case, the CuS crystals are small which is measurable at a nanometer level. PbS and CdS showed the similar results as CuS. Accordingly, when the crystal size was at nanometer level, the absorption edge moves towards the short wavelength. The absorption analysis indicated that the crystal sizes of PbS and CdS were about 4.5 nm and 2.5 nm, respectively.

EXPERIMENT 2

Figure 8:
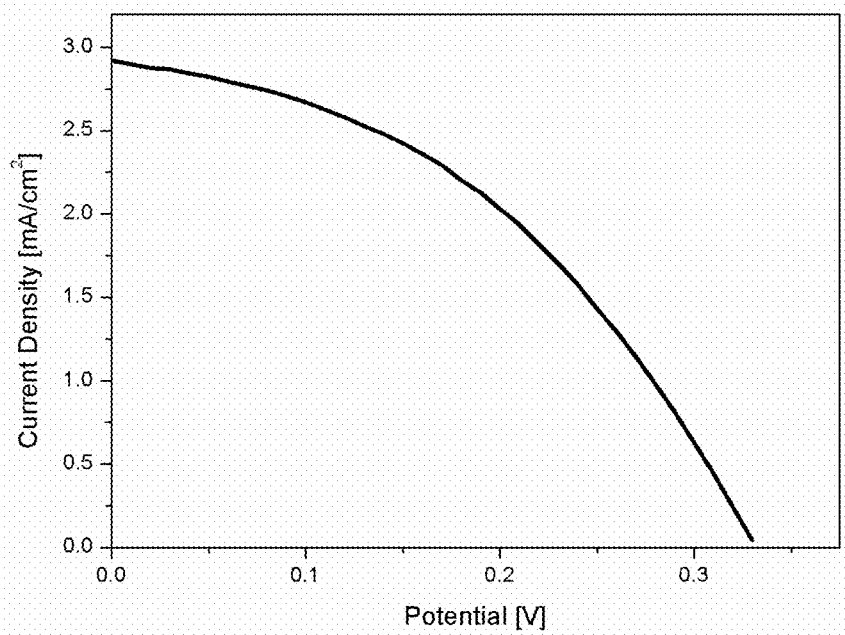
FIG. 8 is a graphical representation plotting a performance of a quantum dot sensitized solar cell including the transparent electrode coated with the quantum dot which is fabricated by Example 4 according to an embodiment.

Performance Analysis of a Quantum Dot Sensitized Solar Cell Including a Quantum Dot-Coated Transparent Electrode The performance of a quantum dot sensitized solar cell including the quantum dot-coated transparent electrode according to an embodiment was analyzed and the results are shown in FIG. 8.

Electrolyte was introduced through the electrolyte inlet which was drilled in the fabrication process of a counter electrode, and the inlet was covered by the high temperature fusion gasket which was 20 μm in thickness. A thin glass substrate was covered on top of the high temperature fusion gasket, to thereby seal the interior. As a result, the solar cell was fabricated. The electrolyte was sulfur (S)-containing electrolyte, in which sodium sulfide ($Na_2S$), sulfur (S), and potassium chloride (KCl) were dissolved in a solvent consisting of water and methanol at a volume ratio of 3:7, at a molar concentration of 0.5:2:0.2.

Referring to FIG. 8, Example 4 according to an embodiment absorbs solar light and produces electricity.

The foregoing exemplary embodiments and advantages are merely exemplary and are not to be construed as limiting the present inventive concept. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of fabricating a transparent electrode for use in a quantum dot sensitized solar cell, the method comprising:
   (S1) introducing quantum dot precursor into a high pressure storage vessel and dissolving the quantum dot precursor using subcritical fluid or supercritical fluid;
   S2) transporting the quantum dot precursor fluid prepared at (S1) to contact with a conductive thin layer substrate comprised of a metal oxide placed in a high pressure reaction vessel, thereby causing the quantum dot precursor to be adsorbed in the metal oxide thin layer;
   (S3) recovering, by transporting, non-adsorbed quantum dot precursor fluid of (S2) to the high pressure storage vessel together with the subcritical fluid or supercritical fluid; and
   (S4) removing the subcritical fluid or supercritical fluid from the high pressure reaction vessel, and reacting the quantum dot precursor, adsorbed at (S2), with a compound comprising a second element which constitutes the quantum dot.

2. The method of claim 1, wherein the supercritical fluid or the subcritical fluid of S1 is selected from the group consisting of subcritical carbon dioxide, supercritical carbon dioxide, subcritical water, supercritical water, subcritical methane, supercritical methane, subcritical ethane, supercritical ethane, subcritical propane, supercritical propane, subcritical butane, supercritical butane, subcritical ethylene, supercritical ethylene, subcritical propylene, supercritical propylene, subcritical methanol, supercritical methanol, subcritical ethanol, supercritical ethanol, subcritical propanol, supercritical propanol, subcritical tetrafluoromethane, supercritical tetrafluoromethane, subcritical difluoromethane, supercritical difluoromethane, subcritical trifluoromethane, supercritical trifluoromethane, subcritical hexafluoroethane, supercritical hexafluoroethane, subcritical pentafluoroethane, supercritical pentafluoroethane, subcritical 1,1,1,2-tetrafluoroethane, supercritical 1,1,1,2-tetrafluoroethane, subcritical difluoroethane, supercritical difluoroethane, and a mixture thereof.

3. The method of claim 1, wherein the subcritical fluid of S1 dissolves the quantum dot precursor below a critical temperature or a critical pressure thereof.

4. The method of claim 1, wherein, if liquid carbon dioxide is used as the subcritical fluid, a high pressure storage vessel to maintain the liquid carbon dioxide in its current state, is maintained at a temperature ranging from about 0° C. to about 30° C., and at a pressure ranging from about 30 bar to about 500 bar.

5. The method of claim 1, wherein the supercritical fluid of S1 dissolves the quantum dot precursor above a critical temperature and a critical pressure thereof.

6. The method of claim 1, wherein, if supercritical carbon dioxide is used as the supercritical fluid, a high pressure storage vessel to maintain the supercritical carbon dioxide in its current state, is maintained at a temperature ranging from about 31 ° C. to about 200° C., and at a pressure ranging from about 73.8 bar to about 500 bar.

7. The method of claim 1, wherein the quantum dot precursor of S1 is an organic metal compound consisting of a metal selected from the group consisting of cadmium (Cd), gallium (Ga), indium (In), plumbum (Pb), copper (Cu), or zincum (Zn) binding to a ligand selected from the group consisting of acetylacetonate, hexafluoroacetylacetonate, tetramethyl-3,5-heptanedionate, cyclooctadiene, and methyl group.

8. The method of claim 7, wherein the quantum dot precursor is selected from the group consisting of: bis(1,1,1,5,5,5-hexafluoro-2,4-pentanedionato)cadmium(II) (Cd(hfac)$_2$), bis(2,4-pentanedionato)cadmium(II), (Cd(acac)$_2$,) cadmium (II) acetate (Cd(OOCCH$_3$)$_2$), cadmium(II) bromide, cadmium(II) chloride, cadmium(II) fluoride, cadmium(II) cyclohexabutyrate, cadmium(II) iodide, cadmium(II) nitrate, cadmium(II) perchlorate (Cd(ClO$_4$)$_2$), dimethyl cadmium(II) ((CH$_3$)$_2$Cd), cadmium(II) carbonate (CdCO$_3$), tris(2,4-pentanedionato)gallium(III) (Ga(acac)$_3$), tris(1,1,1,5,5,5-hexafluoro-2,4-pentanedionato)gallium(III) (Ga(hfac)$_3$), gallium(III) bromide, gallium(III) chloride, gallium(III) fluoride, gallium(III) iodide, gallium(III) nitrate, triethyl gallium (III), diethylamide gallium(III), gallium(III) 2,4-pentadionate (Ga(CH$_3$C$_3$H$_4$O$_2$)$_3$), gallium(III) perchlorate (Ga(ClO$_4$)$_3$), tris(2,2,6,6-tetramethyl-3,5 -heptanedionato)gallium(III) (Ga(TMHD)$_3$), bis(2, 4-pentanedionato)indium (III) (In(acac)$_3$), tris(1,1,1,5,5,5-hexafluoro-2,4-pentanedionato)indium(III) (In(hfac)$_3$), indium(III) acetate (In (OOCCH$_3$)$_3$), indium(III) bromide, indium(III) chloride, indium(III) fluoride, indium(III) iodide, indium(III) nitrate, indium(III) perchlorate (In(ClO$_4$)$_3$), indium(III) trifluoroacetate (In(OOCCF$_3$)$_3$), indium(III) trifluoroacetylacetonate (In(tfac)$_3$), trymethyl indium(III), tris(2,2,6,6-tetramethyl-3,5 -heptanedionato)indium(III) (In(TMHD)$_3$), bis(2,4-pentanedionato)lead(II) (Pb(acac)$_2$), bis(1,1,1,5,5,5-hexafluoro-2,4-pentanedionato)lead(II) (Pb(hfac)$_2$), tris(2,2,6,6-tetramethyl-3,5-heptanedionato)lead(II) (Pb(TMHD)$_2$), lead (II) acetate (Pb(OOCCH$_3$)$_2$), lead(II) bromide, lead(II) chloride, lead(II) fluoride, lead(II) iodide, lead(II) 2,4-pentanedionate (Pb(CH$_3$C$_3$H$_4$O$_2$)$_2$), lead(II) trifluoroacetate (Pb (OOCCF$_3$)$_2$), bis(1,1,1,5,5,5-hexafluoro-2,4-pentanedionato)copper(II) (Cu(hfac)$_2$), bis(2,4-pentanedionato)copper (II) (Cu(acac)$_2$), Bis(6,6,7,7,8,8,8-heptafluoro-2,2-dimethyl-3,5-octanedionate)copper(II) (Cu(FOD)$_2$), tris(2,2,6,6-tetramethyl-3,5-heptanedionato)copper(II) (Cu(TMHD)$_2$), copper(II) bromide, copper(II) Chloride, copper(II) fluoride, copper(II) ethylacetoacetate, copper(II) perchlorate (Cu(ClO$_4$)$_2$), copper(II) tetrafluoroborate (Cu(BF$_4$)$_2$), copper(II) trifluoroacetylacetate (Cu(tfac)$_3$), bis(2,4-pentanedionato)zinc(II) (Zn(acac)$_2$), bis(1,1,1,5,5,5 -hexafluoro-2 ,4-pentanedionato)zinc(II) (Zn(hfac)$_2$), tris(2,2,6,6-tetramethyl-3,5 -heptanedionato)zinc(II) (Zn(TMHD)$_2$), dimethylzinc (Zn(CH$_3$)$_2$), diethylzinc (Zn(C$_2$H$_5$)$_2$), zinc(II) bromide, zinc(II) chloride, zinc(II) fluoride, or zinc(II) tetrafluoroborate (Zn(BF$_4$)$_2$).

9. The method of claim 1, wherein the metal oxide of S2 is TiO$_2$, ZnO, SnO$_2$, or WO$_3$.

10. The method of claim 1, wherein the thin layer substrate of S2 is a transparent substrate on which indium tin oxide (ITO), fluorine dopped tin oxide (FTO), or carbon nano tube is coated, or PEDOT/PSS(poly(3,4-Ethylenedioxythiophene/Poly(4-styrene sulfonic acid).

11. The method of claim 1, wherein the size of the metal oxide of S2 ranges from about 10 nm to about 500 nm, and the thickness of the metal oxide thin layer ranges from about 1 um to about 30 um.

12. The method of claim 1, wherein, if the subcritical fluid is used, the adsorption is carried out under a condition to enable the quantum dot precursor to be dissolved below a critical temperature or a critical pressure of the fluid.

13. The method of claim 12, wherein, if liquid carbon dioxide is used as the subcritical fluid, the temperature and the pressure for adsorption range from about 0° C. to about 30° C. and from about 30 bar to about 500 bar, respectively.

14. The method of claim 1, wherein, if the supercritical fluid is used, the adsorption is carried out under a condition to enable the quantum dot precursor to be dissolved above a critical temperature or a critical pressure of the fluid.

15. The method of claim 14, wherein, if supercritical carbon dioxide is used as the supercritical fluid, the temperature and the pressure range from about 31 ° C. to about 200° C. and from about 73.8 bar to about 500 bar, respectively.

16. The method of claim 1, wherein the adsorption of S3 takes from about 1 minute to about 48 hours.

17. The method of claim 1, wherein the reaction of S4 is carried out in a high pressure reaction vessel at a temperature from about 0° C. to about 500° C., for about 1 minute to about 24 hours.

18. The method of claim 1, wherein the compound comprising the second element constituting the quantum dot of S4 is hydrogen sulfide (H$_2$S), hydrogen selenide (H$_2$Se), or hydrogen telluride (H$_2$Te).

* * * * *